United States Patent [19]

Henri et al.

[11] Patent Number: 4,774,516
[45] Date of Patent: Sep. 27, 1988

[54] METHOD FOR SMOOTHING AN IMAGE GENERATED BY COORDINATE CONVERSION AND A DIGITAL SCAN CONVERTER USING THE METHOD

[75] Inventors: Jean-Claude Henri, Boulogne Billancourt; Jean-Pierre Andrieu, Paris; Dominique Gault, Ville D'Avray, all of France

[73] Assignee: Thomson-CSF, Paris, France

[21] Appl. No.: 1,942

[22] Filed: Jan. 9, 1987

[30] Foreign Application Priority Data

Jan. 10, 1986 [FR] France .................. 86 00321

[51] Int. Cl.⁴ .................................... H04N 7/01
[52] U.S. Cl. ......................... 342/185; 358/140; 364/731
[58] Field of Search .......... 342/185; 358/140; 364/731, 815

[56] References Cited

U.S. PATENT DOCUMENTS

| 4,310,853 | 1/1982 | Madson | 358/140 |
| 4,547,803 | 10/1985 | Richards | 358/140 |
| 4,697,185 | 9/1987 | Thomas et al. | 342/185 |

FOREIGN PATENT DOCUMENTS

| 0071923 | 2/1983 | European Pat. Off. . |
| 0071924 | 2/1983 | European Pat. Off. . |
| 0107595 | 5/1984 | European Pat. Off. . |
| 2315702 | 1/1977 | France . |
| 2493649 | 5/1982 | France . |

OTHER PUBLICATIONS

Walker, J. T., "Digital Scan Conversion and Smoothing for a Real Time Linear Array Imaging System," ACOUSTICAL IMAGING, vol. 8, pp. 1-14.

*Primary Examiner*—Theodore M. Blum
*Assistant Examiner*—Bernarr E. Gregory
*Attorney, Agent, or Firm*—Pollock, VandeSande & Priddy

[57] ABSTRACT

The invention concerns a method for smoothing, through filling, an image generated by the conversion of polar coordinates into Cartesian coordinates. A filling of these pixels not involved in the conversion is performed at the level of the signal received in polar coordinates. Artificial radials are created between the effective radials supplied in polar coordinates and the artificial radials have attributed a non-zero video signal, as a function of the video signals of the adjacent effective radials. These artificial radials are thereafter converted into Cartesian coordinates and fill the pixels otherwise not involved. The invention has application to the digital scan converted for radar display.

13 Claims, 7 Drawing Sheets

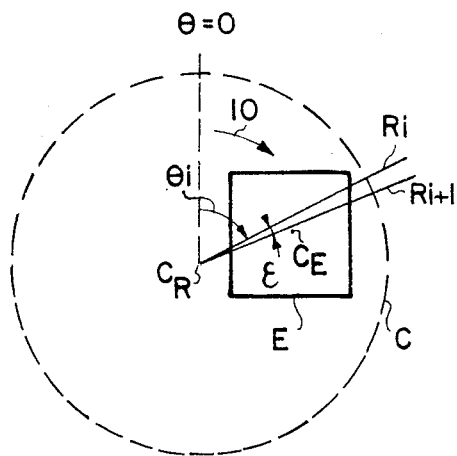
FIG_1
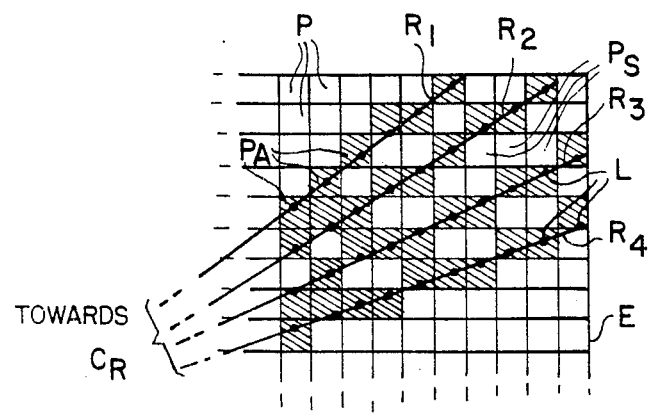
FIG_2

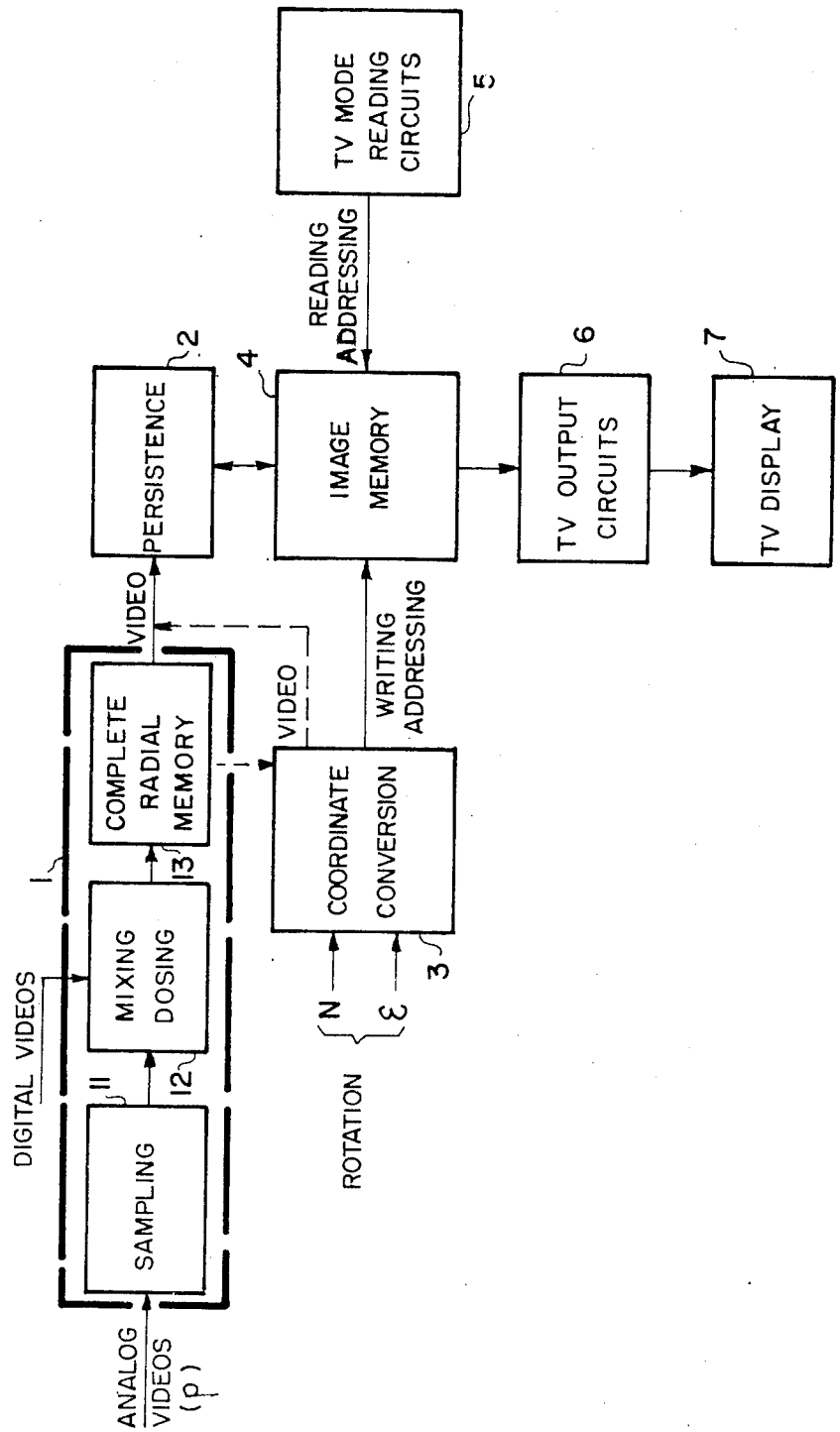

FIG_4
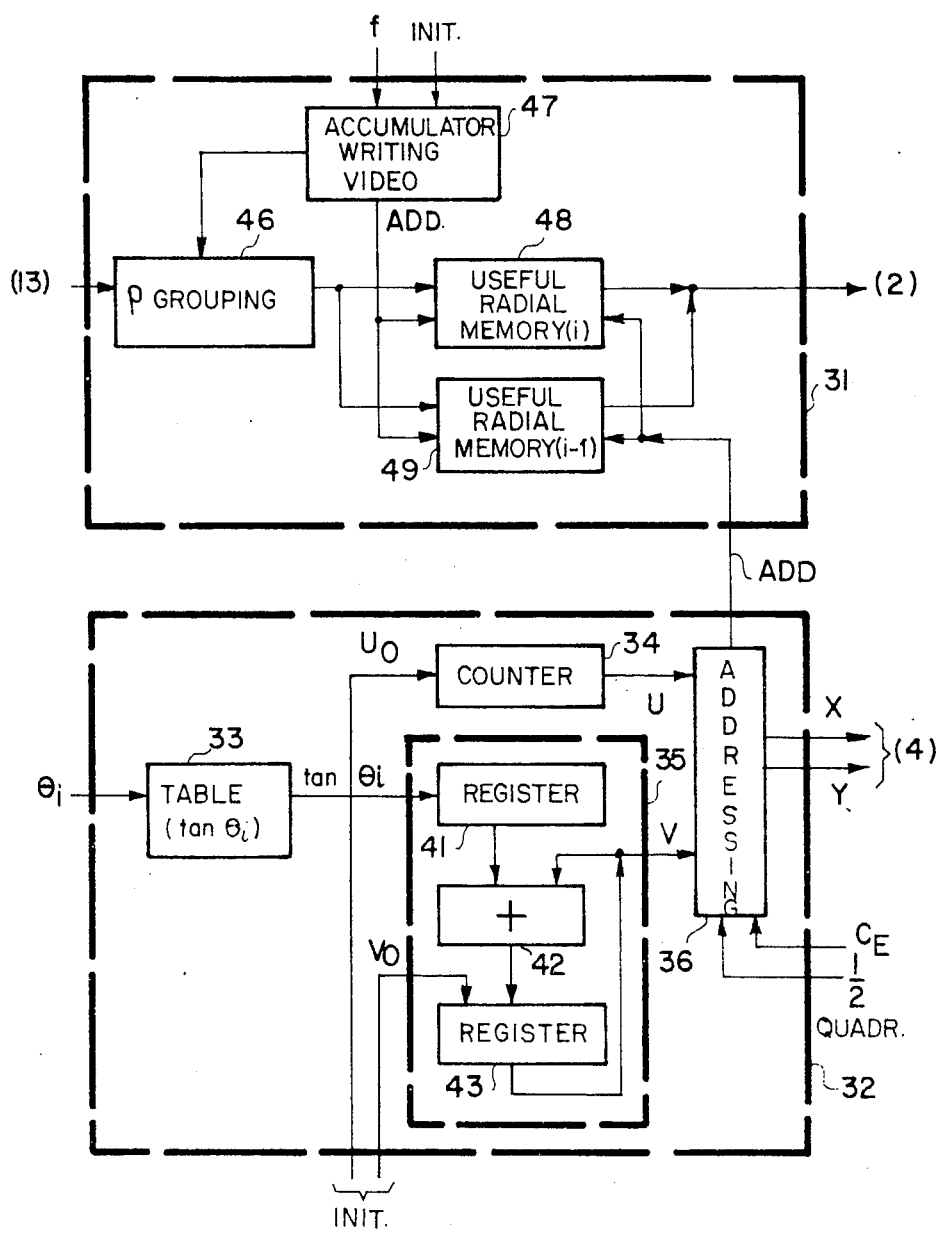

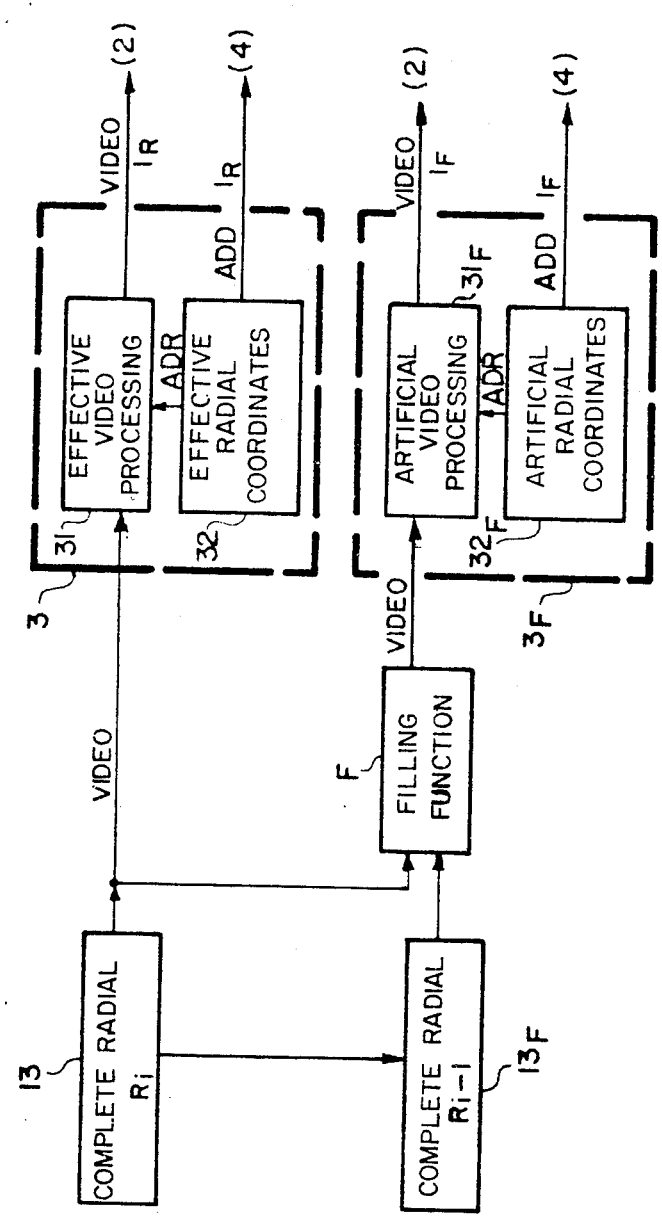
FIG_5

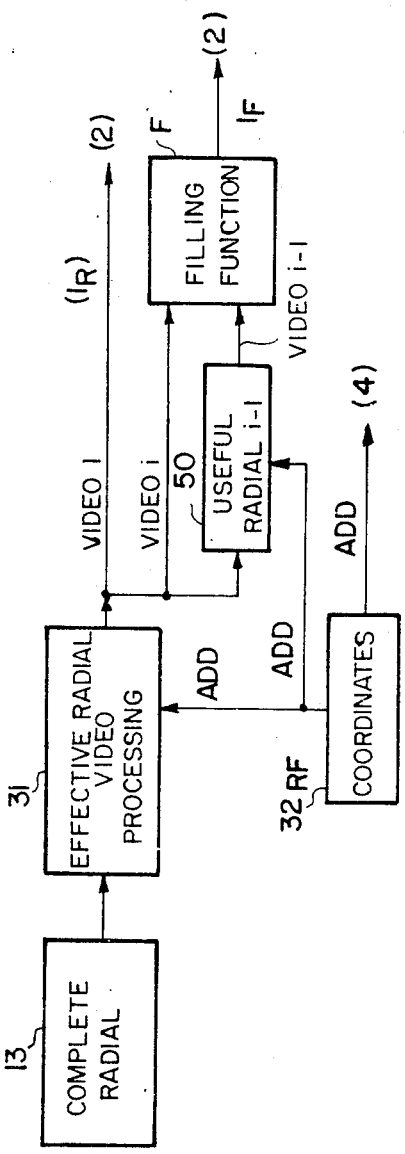
FIG_6
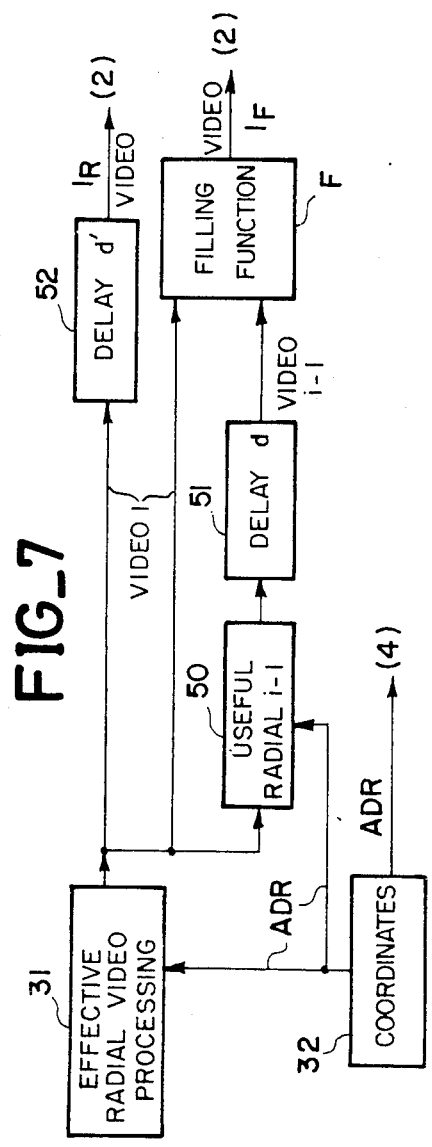
FIG_7

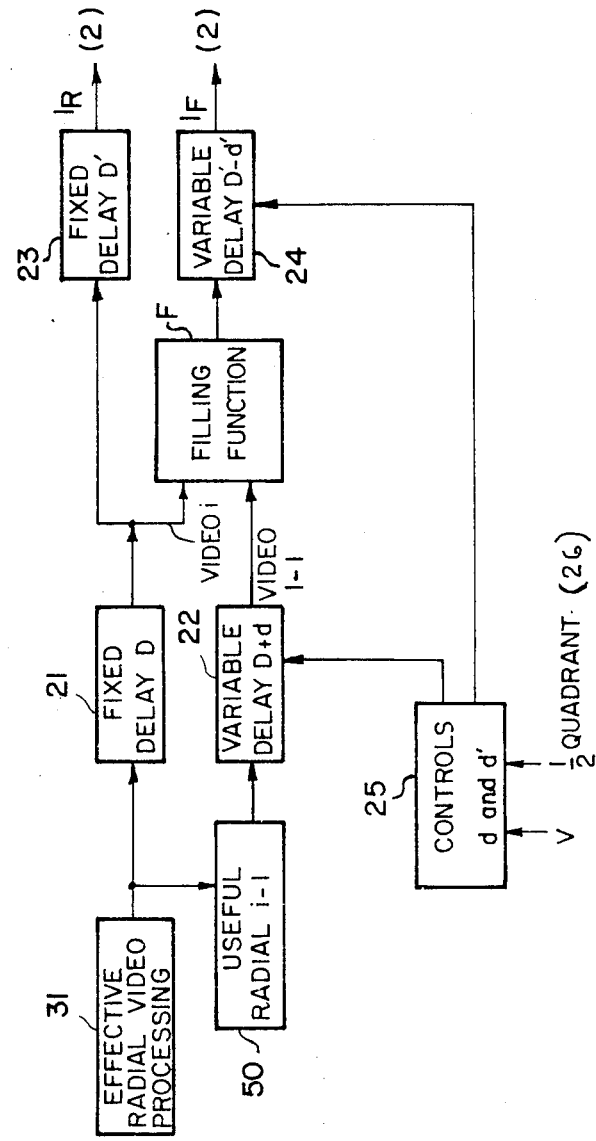
FIG_8

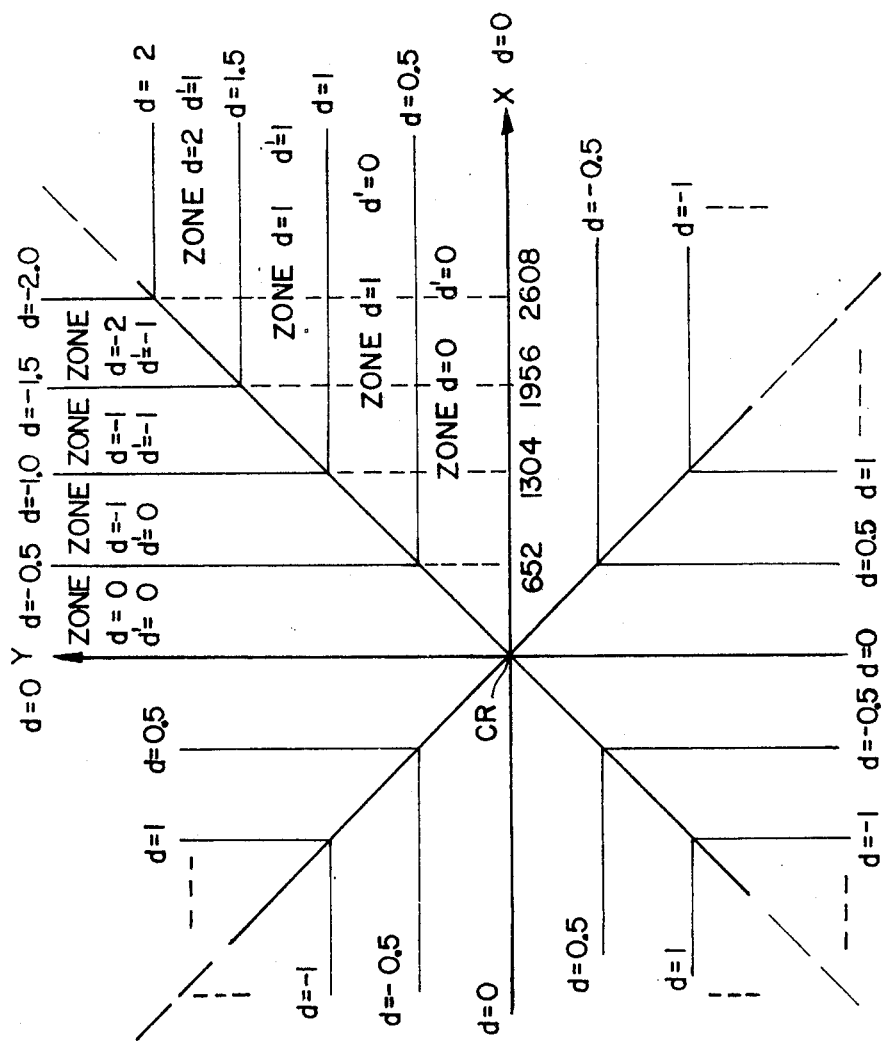
FIG_9

METHOD FOR SMOOTHING AN IMAGE GENERATED BY COORDINATE CONVERSION AND A DIGITAL SCAN CONVERTER USING THE METHOD

FIELD OF THE INVENTION

The present invention relates to a method for smoothing, through filling out an image issuing from the conversion of polar coordinates into Cartesian coordinates. The invention also relates to a digital scan converter (DSC) utilizing said method.

BACKGROUND OF THE INVENTION

In some applications, such as the display of radar data on a television mode scanner screen, the data is supplied in a coordinates system (polar in this example) which is not the system of the display device (Cartesian coordinates in the case of television scanning). Therefore, it is necessary to proceed to a coordinates conversion. In the previous example, this function is carried out by a DSC.

However, when the conversion and/or display process is quantified, as is the case for a DSC and its television display, it can happen that the conversion causes the appearance of dark patches in a luminous zone (in the case of a television display), as explained in detail below (FIG. 2). This gives an uneven appearance to the image. It is thus desirable to smooth the image at this level by "filling" the dark patches, i.e. by conferring thereupon a non-zero luminosity. This defect correction process is known as "pixel filling".

In the framework of the DSC, one solution is known. It will be recalled that a DSC comprises a memory, called image memory, that stores the image to be displayed on the screen, a certain number of bits of this memory being attributed to each of the dots or pixels of the screen considered as distinct. The solution consists in attributing to the pixels not addressed by the conversion, thus dark, a non-zero luminosity value which is a function of luminosity of the adjacent pixels, for example that of the eight pixels which surround the pixel involved. This solution rapidly encounters limits and restrictions, associated essentially to its complexity and to costs incurred, when the processing rates must be high such as is often the case for a radar.

An object of the invention is to provide a method for pixel filling which is not reached by the conversion and which is earlier to perform than the known solution.

According to the invention, this filling is performed not at the level of the pixels of the image memory, but at the level of the signal received in polar coordinates (modulus $\rho$, polar angle $\theta$). If the video signal (amplitude as a function of $\rho$) corresponding to a given value of angle $\theta$ is called "radial", the method thus consists in creating artificial radials between the effective or real radials and in attributing to each of them a video signal which is a function of the video signal of the adjacent effective radials. These artificial radials are thereafter converted into Cartesian coordinates and fill the pixels not previously filled.

BRIEF DESCRIPTION OF THE DRAWINGS

Other objects, features and advantages of the invention will become more apparent from the following description, illustrated by the appended drawings which represent:

FIG. 1 is a diagram illustrating the zone covered by a radar and a part of this zone which is displayed;

FIG. 2 is a diagram illustrating the mechanism by which the conversion of polar coordinates into Cartesian coordinates allows dark regions to appear;

FIG. 3 is a block diagram of a DSC;

FIG. 4 is an embodiment of part of the DSC of the previous figure;

FIG. 5 is a first embodiment of the method according to the invention;

FIG. 6 is a second embodiment of the method according to the invention;

FIGS. 7 and 8 are a diagram of two variants of the preceding figure;

FIG. 9 is an explanatory diagram relating to FIG. 8.

Of these different figures, the same references have been allocated to the same elements.

DESCRIPTION OF THE PREFERRED EMBODIMENTS

FIG. 1 is a diagram illustrating the zone covered by a radar and the part of this zone which is visualized.

In FIG. 1, the radar center $C_R$ and a circle C illustrating the range of the radar have been represented. A rectangle (or square) E has also been represented, with a center $C_E$ that corresponds to the part of the zone C which must be displayed. In this example, the points $C_R$ and $C_E$ do not coincide.

As it is known, the radar antenna rotates in a horizontal plane and its direction is marked (angle $\theta$) with respect to a reference direction, generally north, indicated on the figure by a dotted line $\theta=0$. The direction of rotation of the antenna is indicated by an arrow 10; in this example rotation is clockwise. The position of the antenna is supplied to the radar receiver in the form of a signal representing north (N), supplied at each passage of the radar beam through north, and of an increment angle signal ($\epsilon$) indicating that the beam has rotated on nth of a complete turn with respect to the preceding increment, where n increments correspond to 360°.

The radar periodically emits pulses and receives a video signal constituted by the whole of the responses (echoes) upon each of the pulses. With respect to display, the video signal attributed to each of the successive directions $\theta_i$ of the antenna is visualized along the length of the radii of the circle C, having a center $C_R$, forming successive angles $\theta_i$ with the north, and the data thus visualized is called radial. Two successive radials have been represented on the figure; $R_i$, forming an angle $\theta_i$ with the reference direction, and $R_{i+1}$, forming an angle $\theta_{i+1}$ with the same reference, with $\theta_{i+1} = \theta_i + \epsilon$.

This data is displayed on a television scanning type screen, comprising a predetermined number of pixels, for example 1024 lines each of 1024 pixels. This display requires converting into Cartesian coordinates the video data supplied in polar coordinates.

However, as mentioned, this conversion is performed so that all the pixels are possibly not reached. This case is illustrated in FIG. 2.

FIG. 2 thus represents a portion of the screen E, for example, the end part located to the top right-hand corner of the screen. The surface of the screen has been divided into elementary squares representing the different pixels, arranged in lines and columns and referenced P.

By way of example four radials, referenced $R_1$ to $R_4$, have been represented and, on each of the radials, luminous dots L representing different echoes supplied for example by a single target. A direct display of the data in polar coordinates, visualization of the PPI (Plan Position Indicator) type, will thus supply a substantially homogenous image region.

Furthermore, the pixels involved in the coordinate conversion and thus, in the present case, luminous, have been hatched in. These pixels are referenced $P_A$. It will be observed that when the radials R are sufficiently divergent, i.e. when the radar center $C_R$ is placed sufficiently far away, pixels, referenced $P_S$, appear which are not involved in the coordinate conversion. These pixels remain dark, while the pixels $P_A$ are luminous. This means that a single target no longer appears under the form of a substantially smooth luminous zone but presents dark patches thereby giving it an uneven and disconnected aspect. It is this appearance which the smoothing method for pixel filling, according to the invention, aims to eliminate.

Prior to describing this method in detail, in relation to FIGS. 3 and 4, the classical structure of a digital scan converter will be recalled.

The DSC represented on the block diagram of FIG. 3 mainly comprises:

A television monitor 7, on which the radar data are displayed.

An image memory 4 containing, in digital form, the image that will be displayed on the monitor 7. The capacity of the memory 4 is adapted to the television standard utilized, i.e. it must comprise as many memory cells as the image displayed on the monitor comprises pixels, with a number of bits per cell which is a function of the number of luminosity levels desired (often three bits, i.e. eight levels). The step of reading the contents of the memory 4 intended for the monitor 7, and the step of writing into the radar data memory 4 signals supplied by an assembly 2, are asynchronous; the reading step has priority and during reading the writing is interrupted.

An assembly 1 of circuits for processing the video signals output by the radar and received by the DSC, described in further detail below.

An assembly 3 for the conversion of the polar coordinates into Cartesian coordinates. For this purpose, the assembly 3 receives the signal which is representative of the rotation of the radar antenna, namely the reference direction N and angle increment ε (or, directly, the value of angle θ). The assembly provides the write addressing for image memory 4. The processing assembly 1 supplies, through the intermediary of an assembly 2, the video data to be recorded in image memory 4, synchronized with the write addressing;

An assembly 2 of circuits called artificial persistence circuits which creates for the digital data memorized in memory 4, for which no modifications due to aging exist, a persistence effect comparable to that which is produced on a persistent tube where the brilliance of a point begins to decrease once it has been recorded.

An assembly 5 of television mode reading circuits, providing the read addressing of the image memory 4.

An assembly 6 of output interface circuits in television mode, which receives the data contained in the image memory 4 such as addressed by the assembly 5, provides the digital to analog conversion thereof in order to generate the television video signal intended for the monitor 7, as well as to generate classical television synchronization signals.

The assembly 1 of radar video signal processing circuits receives, on the one hand, a synchronization signal indicating that a pulse has been emitted by the radar and, on the other hand, the video itself, constituted by all the responses to this pulse. This assembly 1 comprises a circuit 11 for sampling the analog video signal(s) received, that provides for its digital conversion and supplies the result to an assembly of circuits 12. The circuits 12, where necessary, receive further digital video signals (cartography data, for example) and provide for the mixing of all this data, that is thereafter transmitted to a memory 13, called the radial memory. The radial memory 13 stores the processed and digitized video signal relating to a complete or "full range" radial, i.e. the video signal attributed to a given angle θ, from the center $C_R$ of the radar up to the limit C (FIG. 1) and will full definition. Generally, the assembly 1 contains two radial memory elements, working alternately in reading and writing. In alternative embodiments, it can contain more than two such elements.

All the circuits represented in FIG. 3 work under the control of the synchronization of a control circuit (not represented), for example a microprocessor, which receives both the radar video signals and the antenna rotation signals.

FIG. 4 represents an embodiment of the coordinate conversion assembly 3 of FIG. 3.

The assembly of FIG. 4 comprises an assembly 32 performing the coordinate conversion and, in a preferred embodiment, an assembly of circuits 31 processing the video signal output from the radial memory 13. In this case, the path of the video signal passes, in FIG. 3, through the assembly 3 such as illustrated by dashed arrows.

The assembly 32 thus has the function of supplying the Cartesian coordinates (X and Y) from antenna rotation data (N and ε or directly, as represented, θ). The principle utilized is that of accumulation. Beginning for example from the point the closest to the radar center ($C_R$), of which the coordinates are supplied to the assembly 32, the coordinates of each of the points of a single radial are successively computed. Two methods are known: accumulation in sine-cosine and accumulation in tangent.

By the first method, a point $I_i$ of a radial (angle $\theta_i$) is calculated from the preceding point $I_{i-1}$ ($X_{i-1}$, $Y_{i-1}$) distant from a unitary modulus ($\rho=1$) by the following expressions:

$$I_i \begin{bmatrix} X_i = X_{i-1} + \sin \Theta_i \\ Y_i = Y_{i-1} + \cos \Theta_i \end{bmatrix}$$

This method is called sine and cosine accumulation.

By the second method, called tangent accumulation, it is necessary to distinguish whether $\theta_i$ is lower than or higher than $\pi/4$ (modulo $\pi/2$): if $0 \leq \theta < 45°$, the Y increment between $I_{i-1}$ and I is taken equal to unity, therefore:

$$I_i \begin{bmatrix} X_i = X_{i-1} + \tan \Theta \\ Y_i = Y_{i-1} + 1 \end{bmatrix} \quad (1)$$

if $45° < \theta < 90°$, the X increment between $I_{i-1}$ and I is taken equal to unity, then:

$$I_i \begin{bmatrix} X_i = X_{i-1} + A \\ Y_i = Y_{i-1} + \tan(\pi/2 - \Theta) \end{bmatrix} \quad (2)$$

By way of example, the remainder of the present description is given in the case of the second method (tangent accumulation), which presents advantages, especially regarding optimization, with respect to the first method.

With this purpose, the assembly 32 comprises:

A table 33 of the different values of the trigonometric functions, for example tangent, of each of the angles $\theta_i$ defining respectively the n radials. This table is preferably constituted by a memory addressed for example by the successive values ($\theta_i$) of angle $\theta$.

A first accumulator 35 for elaborating the coordinate which undergoes an accumulation in tan $\theta$, i.e. X in the first semi-quadrant and Y in the second semi-quadrant, modulo $\pi/2$ (cf. expressions (1) and (2) above). This coordinate is referenced V. With this purpose, the accumulator 35 receives from the preceding table 22 the value tan $\theta_i$ as well as the initializing value, i.e. the coordinate (referenced $V_o$) of the first point of the displayed radial, or useful radial. The accumulator 35 is constituted by an adder 42 surrounded by an input register 41, receiving for each radial the value of tan $\theta_i$, and an output register 43. This latter register receives the initial coordinate $V_o$. Its output supplied the current coordinate V along the length of the radial during the accumulations and is further directed towards the adder 42.

A second accumulator 34 for elaborating the other coordinate, referenced U, which undergoes an accumulation equal to +1, i.e. Y in the first semi-quadrant and X in the second, modulo $\pi/2$. This second accumulator can be constituted simply by a counter, receiving as initial value the coordinate ($U_o$) of the first point of the radial.

An assembly of circuits 36 for writing addressing of the image memory 4 and the reading addressing of the assembly 31. For this purpose, circuit 36 receives the coordinates U and V provided by accumulator 34 and 35, and data identifying the semi-quadrant including the involved angle $\theta_i$. Circuit 36 operates according to the Cartesian coordinates of the points forming the radial with respect to the radar center $C_R$. It also receives Cartesian coordinates of the screen center $C_E$ in order to express the coordinates (X,Y) of the points of the radial with respect to $C_E$. The assembly 31, positioned on the path of the video, comprises:

A first memory 48, positioned between the complete radial memory 13 (of the assembly 1) and the persistence circuits 2. The purpose of this memory is to memorize the useful part (for the display) of the radial contained in the memory 13.

A second memory, referenced 49, connected in parallel to the memory 48. These two memories 48 and 49 have the same purpose, but one performs a writing step when the other performs a reading step, and vice versa.

A device 46, called $\rho$ grouping device, for compressing the whole or part of the video data contained in the radial memory 13, by a factor f. This factor is chosen so that the part of the radial selected by the operator can be displayed on the TV screen. By way of example, if the radial comprises 4096 dots and if, taking into account the position selected by the operator for the screen center $C_E$, the screen can only display 1024 dots for this radial, the display of the full range of the initial radial implies a scale compression factor f=4. In this case, four dots are grouped together into a single dot, for example by a maximum function. The $\rho$ grouping device 46 is thus positioned between the radial memory 13 and the radial memories 48 and 49. The grouping is controlled by an accumulator 47 which receives the factor f and the initialization coordinates, i.e. those of the first dot of the useful radial, into polar coordinates. The accumulator 47 also provides write addresses for the memories 48 and 49. Accumulator 47 is analogous to the accumulator 35.

All the circuits of assembly 3 represented in FIG. 4 are, as mentioned above, controlled and synchronized by the control device of the DSC, which ensures in particular the accumulation controls and the supply of the initial values.

During operation, in a first step, the reading of the radial memory 13 and the writing of this data (angle index i) in the radial memory 48, for example, is performed. In a second step, the circuit 36 controls the reading of memory 48 to write the image memory 4, via the persistence assembly 2, in synchronism with the write addressing memory 4. Simultaneously, during the first step, the reading of the previously recorded memory 49 (index i-1) is performed, then the writing of this same memory 49, during the second step is performed.

FIG. 5 represents a first embodiment of the method according to the invention.

It will be recalled that an object of the method according to the invention is to "fill" the pixels which would not be reached by the conversion of the effective radials alone. For this purpose, the method creates artificial radials between the effective radials and attributes to each of them a non-zero video signal, as a function of the video signal of the adjacent effective radials. More precisely, that non-zero video signal is a function of the value of the video signals which are located at the same modulus $\rho$ alone.

In this first embodiment, the artificial radials intended for the filling are created at the level of the radials stored in radial memory 13.

FIG. 5 represents the radial memory 13 of the assembly 1, containing the radial $R_i$, as well as the assembly 3 with the sub-assemblies 31 and 32 such as described in FIG. 4. The sub-assemblies 31 and 32 supply respectively the video and the corresponding address of the effective image noted $I_R$.

In order to create the artificial filling radials, the device further comprises a second radial memory, referenced $13_F$ which contains the preceding radial ($R_{i-1}$) The two radials $R_i$ and $R_{i-1}$ thereafter pass through a circuit F, mixing the two radials according to a predetermined filling function that is described below. The result, which is therefore an artificial radial, is transmitted to an assembly of circuits $3_F$ analogous to the assembly 3 but processing an artificial radial and not an effective radial. The different circuits constituting the assembly $3_F$ bear the same references as those of the assembly 3, but have an index F. This assembly $3_F$ is therefore comprised of two sub-assemblies $31_F$ and $32_F$ that supply, respectively, the video and the corresponding address of the artificial radials, noted $I_F$. It is to be noted that at any moment, the coordinate $U_R$ of the effective radial is the same as the coordinate $U_F$ of the artificial radial, since it is calculated from the same $U_o$ by successive accumulation of the value +1, thus independent from θ. In another embodiment, it is possible not to completely double the "coordinates" sub-assemblies 13 and $13_F$, since the accumulator 34 (FIG. 4) is able to be used in common.

The mixing performed by the circuit F between radial $R_i$ and radial $R_{i-1}$ in order to produce an artificial radial can be, for example, one of three types: barycentric, minimum or maximum. This is realized with a constant value for $\rho$, as mentioned before. In other words, each pixel of the radial $R_i$ is respectively mixed with the pixels of the radial $R_{i-1}$ which are positioned at the same modulus $\rho$, to produce respectively the pixels of the artificial radial. The circuit F is a logic circuit. This can be for example a read-only memory of the PROM type.

The barycentric function attributes to the artificial radial a video signal resulting from the weighing of the video of the adjacent radials. If a single artificial radial is created between two consecutive effective radials $R_{i-1}$ and $R_i$ (filling called of second degree), the video attributed to the artificial radial (F) can be written:

Video (F) = ½·Video($R_{i-1}$) + ½·Video($R_i$).

If two artificial radials are created between two consecutive effective radials (called filling of third degree), the video of each of these artificial radials $F_1$ and $F_2$ can be expressed as:

Video ($F_1$) = ⅔·Video($R_{i-1}$) + ⅓·Video($R_i$)

Video ($F_2$) = ⅓·Video($R_{i-1}$) + ⅔·Video($R_i$).

More generally, when N-1 artificial radials are created between two consecutive effective radials (degree N filling) the following is obtained for the artificial radial of rank k($F_k$)

Video ($F_k$) = (N-k)/N·Video($R_{i-1}$) + k/n·Video($R_i$).

It appears that this first method allows filling the dark zones located between two luminous zones. It is furthermore to be noted that the first method enlarges the effective luminous zones. This has the advantage of performing a filtering function in the case where an echo has been missed by the system, when it is surrounded by two correctly recorded echoes; the hole thus created could be reduced. On the contrary, a clutter echo will be enlarged. Another drawback of this method is that the separating power of two adjacent echoes decreases; two adjacent echoes risk having their spacing "filled".

A second method consists in attributing to the artificial radials a video constituted by the maximum of the videos of the adjacent effective radials:

Video ($F_k$) = MAX [Video($R_{i-1}$), Video($R_i$)].

According to this second method, k fictive radials are created between two effective radials, these artificial radials all having the same video. The effects of this method are an accentuation of the advantages and the drawbacks of the previous method. The "holes" are erased to a maximum but the separating power is very poor.

A third method consists in attributing to the artificial radial a video resulting from the minimum of the videos of the adjacent radials:

Video ($F_k$) = MIN [Video($R_{i-1}$), Video($R_i$)].

According to this method, k fictive radials are also created between two effective radials, these artificial radials having the same video. It appears that this latter method fills the inside of the echoes but does not enlarge the edges thereof. The advantages and the drawbacks are contrary to those of the preceding methods, i.e. the minimum function not enlarging the echoes, the separating power is not affected and the importance of the clutter echoes is not increased. On the other hand, the filtering effect of filling the parasitic holes is not obtained in this case.

The pixels of two adjacent radials can fall into the same pixel. In this case, as is known, either the video is only taken from one of the radials, or a grouping together of the radials is performed corresponding to the same pixel. In this latter case, the grouping together is generally carried out in the form of a maximum function. This grouping together has the effect of strengthening the filtering function performed by the first two methods. In fact, the maximum is taken between a zero video for the hole and non-zero video for the added artificial radials.

When such a grouping together is performed in the framework of the third method (minimum function), another advantage of this third method thus appears, which is always to preserve the priority of the effective radials over the artificial radials during the grouping together.

The solution described below, which consists in creating artificial radials from complete radials, presents the advantage of disposing of videos in the correct coordinates system ($\rho,\theta$). It has the drawback of being somewhat lengthy, the complete radials representing fairly large memory capacities to be processed at high speeds. Further, the continuation of the processing chain is entirely doubled and this doubling intervenes very early in the chain.

The structure represented in FIG. 5 thus allows filling to be performed by synchronous artificial radials of degree 2. Synchronous filling refers to a method in which the effective radials and the artificial radials are simultaneously transmitted to the image memory. In order to perform a synchronous filling of a higher degree, it is necessary to correlatively multiply the different units, which rapidly becomes prohibitive from the point of view of space required and costs of the system. However, the synchronous filling presents the following advantages:

The different operations for creating artificial radials and coordinate conversion are processed in parallel, they do not introduce any restriction upon the speed of rotation of the radar; and The method does not increase the effort required to write the image memory with respect to the effective image, since the image memory comprises a sufficient number of independently addressable (recordable in this case) cells (or memory packages).

Another solution consists in performing an asynchronous filling, i.e. in sending the radials, effective or artificial, one after another, to the image memory. With this purpose, the radial $R_{i-1}$ is memorized then, when the following radial $R_i$ is available, the artificial video is calculated along with the coordinates of the artificial filling radial. When the filling of k degree (k artificial radials), the elements of the k fictive radials are successively computed and they are progressively transmitted to the image memory.

This method requires a time available between two effective radials that is sufficient to compute the elements of the artificial radial(s). Thus it is poorly adapted for radars having a high rotation speed. Furthermore, it increases the effort required to write the image memory. The effort is multiplied by the degree k of the filling. On the other hand, the method no longer requires the existence of parts of independently addressable memories (packages).

According to an alternative embodiment, it is possible to provide a structure allowing synchronous filling mode of degree 2 and to pass a synchronous filling mode of a higher degree once the speed of rotation of the radar so permits.

FIG. 6 represents a second embodiment of the method according to the invention, in which the artificial radials are created from the radials stored in memories 48 and 49, and not from radials stored in the radial memory 13.

In FIG. 6, given by way of non-limiting illustration, the case of a synchronous filling of degree 2, represents the radial memory 13 and the two sub-assemblies of the assembly 3 for converting the coordinates; one is referenced 31, as previously, and the other is referenced 32$_{RF}$. In fact, the assembly 32$_{RF}$ is modified with respect to that of assembly 32, FIG. 4, in order to contain two accumulators in V (accumulator 35), one attributed to the effective radial and the other to the artificial radial. The complete system here comprises furthermore a circuit ensuring the filling function F, analogous to that of FIG. 5, and a supplementary memory 50 containing the radial which can be referenced as $R_{i-1}$, if the effective radial (video $I_R$) during transmission to the persistence circuit 2 is of rank i.

The radials $R_i$ (processor 31) and $R_{i-1}$ (memory 50) are read under the control of the unit 32, simultaneously in synchronism with the accumulations and supplied to the unit F, which as previously supplies a video signal $I_F$ for the artificial radial which is output to the persistence circuit 2. The memory 50 is connected so as to undergo during a single memory cycle a reading of its contents (radial $R_{i-1}$) then a writing of the contents (radial $R_i$) of the memory being read (48 or 49) and this at the same point of the memory 50.

It appears that this second embodiment allows, with respect to the preceding one, to have a structure that is simpler, since the only additions are radial memory 50, the unit F and an accumulator in V.

However, when as described here the accumulations are performed in tangent, the two video signals i and i-1 entering into the unit F are located at the same coordinate U (equal to X or Y) and not at the same molulus $\rho$ as is the case in the structure of FIG. 5. Then, the fact of creating a filling from effective points located at a same U (hereinafter called constant filling U), i.e. at constant Y up to 45°, then at constant X after, modulo $\pi/2$, introduced privileged directions and a heterogeneity of the filling mode according to the angle. This is therefore correct close to the axes but incorrect close to the diagonals. A correction is thus desirable so that the unit F generates an artificial video from the points located at a same $\rho$.

According to the invention, this correction is performed by causing a delay r to the video of rank i-1.

However, in order to maintain the filling advantages with respect to the conversion of the coordinates into tangent, and in particular the coordination of the U coordinate and the simplified memory organization which results therefrom, it is preferable to transmit to the image memory 4 videos located at the same U. The return from constant $\rho$ to constant U is performed in the same way, by delaying the video of the effective radial by a duration d'. Thus, the two videos presented at the continuation of the system are themselves located at the same U.

This latter configuration is illustrated in FIG. 7 which represents the same elements as FIG. 6 (apart from the memory 13) to which have been added:

A first delay circuit 51, conferring a delay d to the effective radial of rank i-1, prior to its passage in the logic circuit.

A second delay circuit 52, conferring a delay d' upon the effective radial of rank i, prior to its transmission to the persistence circuit 2.

It has been observed that the delay values d and d' to be applied change their sign at each semi-quadrant. The application of a negative delay not being possible, one solution is to dispose four variable delays, before and after the logic circuit F, on each of the effective radial/-fictive radial paths.

However, a preferred solution is represented in FIG. 8, which consists in subjecting the effective radial to two fixed delays, one prior to and the other after its utilization for the filling (logic circuit F) and the subjecting artificial radial two variable delays at the same levels. FIG. 8 represents the video processing unit of the effective radial $R_i$ during reading, the memory 50 containing the preceding radial $R_{i-1}$.

According to this embodiment, interposed in the path of the effective video $I_R$ is a first fixed delay 21, having a value D and a second fixed delay 23 having a value D'. In the path of the artificial filling video, two variable delays are interposed at the same levels, respectively 22 having a value D+d and 24 having a value D'−d'. The variable delay values d and d' are given by a control circuit 25. Calculation shows that the delay d is given by:

$$d = \epsilon V$$

and the delay d' by:

$$d' = \epsilon(N-k)/N \, V$$

where $\epsilon$ is the increment of the angle and V the other Cartesian coordinate (Y when U=X and vice versa) in the case of a N degree filling for the kth radial.

This embodiment of FIG. 8 has the supplementary advantage of introducing into the path of effective radials a total delay (D+D') that is fixed and common.

The expressions showing d and d' are independent of U, the control circuit 25 supplying to the delay circuits 22 and 24 values d and d' can be performed by means of a read-only memory (of the PROM type for example) addressed by V and the semi-quadrant data (arrows 26 on the figure).

FIG. 9 illustrates the content of such PROM memory useful for this purpose; in this example, with 8192 effective radials per rotation and a degree 2 filling. The coordinate V is equal alternately to X and Y, as mentioned above. The delays d and d40 vary between zero and ±Z, by integers, according to the values of X or Y.

The description given above is by way of non-limiting illustration. Thus mention is made of radar data display but the method of the invention is applicable to display of any data supplied in polar coordinates, such as those issuing from a sonar, from echography systems, etc. The specification has described the creation of artificial radials the length of which is that of effective radials, either the complete radials (memory 13) or useful radials (memories 48, 49, 50). But artificial radials can be only a fraction of these effective radials, created for example in peripheral zones of the range C (FIG. 1) where the filling if required most.

We claim:

1. A method for smoothing an image generated by coordinate conversion, the image being supplied in polar coordinates in the form of a succession of effective radials, each of said radials having a distinct polar angle θ, said radials to be displayed in Cartesian coordinates on a screen comprising a predetermined number of pixels, the method filling in pixels not addressed by the coordinate conversion, and including a step of creating at least an artificial radial between two consecutive effective radials, each such artificial radial comprising plural pixels each associated with a video amplitude, the video amplitude attributed to each pixel of the artificial radial being a function of the video amplitude of the pixels of adjacent effective radials located at the same radial location.

2. A method according to claim 1, wherein said function is of the barycentric type.

3. A method according to claim 1, wherein said function is a minimum function.

4. A method according to claim 1, further comprising steps for creating a plurality of artificial radials between two consecutive effective radials.

5. A method according to claim 1, further including the steps of storing said converted image in an image memory prior to display of said converted image on said screen, calculating pixel values of said artificial radials when receiving an effective radial and then sending the calculated, artificial radials one after another to said image memory, said effective radials and said artificial radials thus being asynchronously sent to said image memory.

6. A method according to claim 1, which includes the further step of storing said converted image in an image memory prior to display of said converted image on said screen, and sending said artificial radials and said effective radials simultaneously to said image memory in a synchronous mode.

7. A digital scan converter for smoothing an image generated by coordinate conversion, the image being supplied in polar coordinates in the form of a succession of effective radials, each of said effective radials having a distinct polar angle θ, said radials to be displayed in Cartesian coordinates on a screen comprising a predetermined number of pixels, the scan converter filling in pixels not addressed by the coordinate conversion, and including:

at least first radial memory means for storing a complete effective radial of rank i;

first conversion circuit means for converting polar coordinate into Cartesian coordinates;

image memory means for receiving as data, data read from said first radial memory means and as addresses, coordinates supplied from said first conversion circuit means; and creating means for creating at least an artificial radial between two consecutive effective radials, each such artificial radial comprising plural pixels each associated with a video amplitude, the video amplitude generated by said creating means for each pixel of the artificial radial being a function of the video amplitude of the pixels of the adjacent effective radials located at the same radial location.

8. A digital converter according to claim 7, said creating means comprising:

second radial memory means for storing a complete effective radial of rank i-1;

filling assembly means, receiving the effective radials of rank i and i-1 and supplying a video signal for a complete artificial radial as a function of said effective radials;

second conversion circuit means for converting polar coordinates for the artificial radial into Cartesion coordinates; and means for transmitting said artificial radial to said image memory means at an address determined by said second conversion circuit means.

9. A digital converter according to claim 7, said creating means comprising:

second radial memory means for storing part of an effective radial of rank i, termed a useful radial of rank i;

third radial memory means for storing part of an effective radial of rank i-1, termed a useful radial of rand i-1;

filling means receiving the effective useful radials of rank i and i-1 and generating a video signal for an artificial radial as a function of the effective radials and for transmitting the artificial radial to said image memory means at an address generated by said first conversion circuit means assembly.

10. A digital converter according to claim 9, said creating means further comprising first circuit means for delaying the useful radial of rank i-1, by a first delay such that the signals received by the filling means representing respectively the useful radials of rank i and i-1 correspond to pixels located at an equivalent radial location.

11. A digital converter according to claim 10, said creating means further comprising second circuit means for delaying the effective usefule radial of rank i, prior to input to said image memory means, by a second delay so that the video signals received by said image memory means and representing respectively the effective and artificial radials correspond to pixels located on a single straight line, parallel to an axis of a Cartesian coordinate system.

12. A digital converter according to claim 9, said creating means further comprising:

first delay circuit means for delaying by a first fixed delay a signal output from the second radial memory means;

second delay circuit means for delaying by a first fixed delay and a first variable delay a signal output from the third radial memory means, the filling means receiving signals output from said first and second delay circuit means;

third delay circuit means for delaying by a second fixed delay a signal output from said first delay circuit means;

fourth delay circuit means for delaying, by said second fixed delay and a second variable delay, a signal output from the filling means.

13. A digital converter according to claim 12, wherein said first variable delay of said second delay circuit means is given by:

$$d = \epsilon \cdot V$$

and said second variable delay of said fourth delay circuit means is given by:

$$d' = \epsilon \cdot (N-K)/N \cdot V$$

where:

$\epsilon$ is an angle increment separating two consecutive effective radials;

K is a rank of the considered radial;

N is a filling degree; and

V is a Cartesian corrdinate, equal to X for $\theta$ between 0°°and 45° and to Y for $\theta$ between 45° and 90°, where $\theta$ is the polar angle of the considered radial and X, Y are the Cartesian coordinates of a pixel of the radial.

* * * * *